United States Patent [19]

MacDonald et al.

[11] Patent Number: 5,249,287
[45] Date of Patent: Sep. 28, 1993

[54] GENERAL KEYBOARD INTERFACE FOR OPERATING WITH TWO TYPES OF KEYBOARDS

[75] Inventors: James R. MacDonald; Doug Gephardt, both of Austin, Tex.

[73] Assignee: Advanced Micro Devices, Inc., Sunnyvale, Calif.

[21] Appl. No.: 577,918

[22] Filed: Aug. 31, 1990

[51] Int. Cl.⁵ .............................. G06F 3/02
[52] U.S. Cl. ..................... 395/500; 364/238; 364/234; 364/242.1; 364/232.9; 364/DIG. 1
[58] Field of Search ............... 395/325, 500; 370/58.1, 370/58.2; 341/22; 364/709.01, 709.02

[56] References Cited

U.S. PATENT DOCUMENTS

| | | | |
|---|---|---|---|
| 4,027,290 | 5/1977 | Subrizi | 395/275 |
| 4,064,560 | 12/1977 | Baxter | 341/22 |
| 4,115,856 | 9/1978 | Labeye-Voisin | 395/325 |
| 4,124,888 | 11/1978 | Washburn | 395/275 |
| 4,264,984 | 4/1981 | Anderson | 395/250 |
| 4,266,271 | 5/1981 | Chamoff | 395/200 |
| 4,689,761 | 8/1987 | Yurchenco | 364/708 |
| 4,727,478 | 2/1988 | Endfield | 395/275 |

*Primary Examiner*—Thomas C. Lee
*Assistant Examiner*—Eric Coleman
*Attorney, Agent, or Firm*—Foley & Lardner

[57] ABSTRACT

A keyboard interface is implemented in an integrated circuit and supports first and second types of keyboards and associated interfaces from a single set of integrated circuit terminals. The keyboard interface includes a first keyboard logic responsive to a first mode select signal for providing a first set of control signals for supporting the first type of keyboard and second keyboard logic responsive to a second mode select signal for providing a second set of control signals for supporting the second type of keyboard. A multiplexer couples the first set of control signals to the set of terminals responsive to the first mode select signal and couples the second set of control signals to the set of terminals responsive to the second mode select signal. A keyboard register provides the first or second mode select signals to the first and second keyboard logic and the multiplexer.

12 Claims, 1 Drawing Sheet

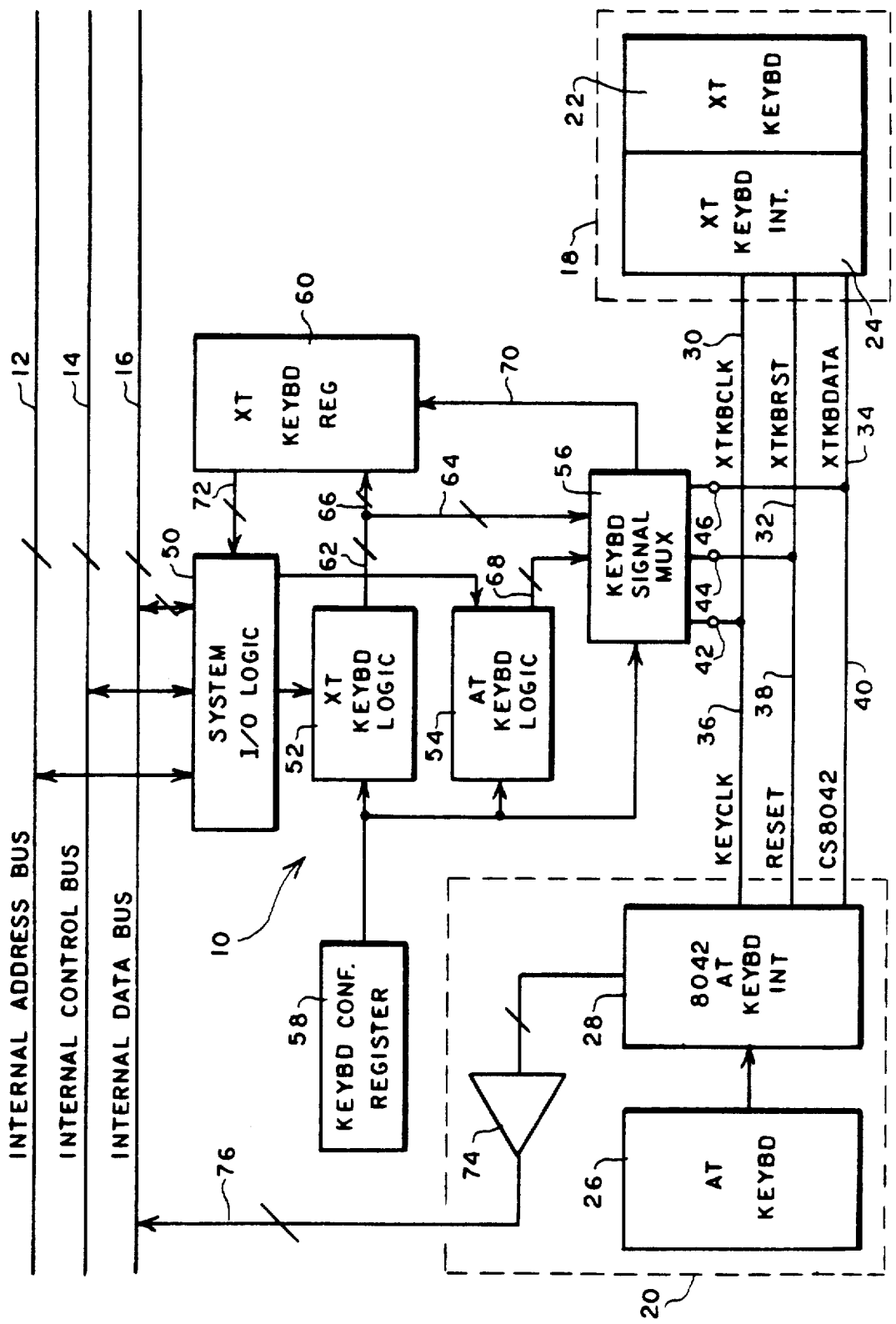

GENERAL KEYBOARD INTERFACE FOR OPERATING WITH TWO TYPES OF KEYBOARDS

BACKGROUND OF THE INVENTION

The present invention generally relates to a keyboard interface implemented in an integrated circuit for interfacing either first or second external keyboards of different types to a central processing unit. The present invention more particularly relates to such a keyboard interface wherein the integrated circuit includes a set of terminals adapted to be coupled to either the first or second type of keyboard, and selectable first and second keyboard logic for supporting either the first or second type of keyboard at the set of integrated circuit terminals.

Keyboards are used in many applications for inputting data into a system. One such application is in personal computer systems which include a central processing unit and wherein a peripheral keyboard is used to input data onto the central processing unit controlled system data bus.

Two popular keyboards commonly used are referred to in the art as an AT type and an XT type. The AT and XT type of keyboards are very different.

The AT type keyboard is arranged to function with an associated 8042 microcontroller keyboard interface which requires its own set of control signals from the system in which the AT type keyboard is used. The 8042 microcontroller is also arranged to provide data generated from the AT type in an 8-bit parallel format which is buffered and then placed directly onto the data bus of the system.

The XT type keyboard is generally less expensive than the AT type keyboard. It also has its own interface which requires its own set of control signals from the system in which the XT type keyboard is used. In contrast to the AT type keyboard and associated 8042 interface, the XT type keyboard and the associated interface provide data generated by the keyboard in serial-bit format. The system in which such a keyboard is utilized, must therefore include the functionality of converting the serial-bit data to 8-bit parallel-bit data and placing the parallel-bit data onto the data bus of the system.

In systems wherein keyboards are required, it would be advantageous to provide the system user with the flexibility of being able to use either type of keyboard. Unfortunately, in the past, their functionality has not been provided. Also, in systems, such as personal computer systems, wherein integrated circuits are utilized, it would be advantageous to provide this functionality within an integrated circuit while utilizing the same set of integrated circuit terminal pins for supporting either type of keyboard.

SUMMARY OF THE INVENTION

The present invention provides a keyboard interface implemented in an integrated circuit for use in a system which is adapted to include a first type of keyboard and associated interface or a second type of keyboard and associated interface external to the integrated circuit for entering data onto an internal data bus within the integrated circuit, wherein the first and second types of keyboards and associated interfaces are of respective different types. The keyboard interface is selectively operable to support either the first or second type of keyboard and associated interface and includes a set of terminals adapted to be coupled to either the first or second type of keyboard interface, first keyboard logic means responsive to a first mode select signal for providing a first set of control signals for supporting the first type of keyboard and associated interface and second keyboard logic means responsive to a second mode select signal for providing a second set of control signals for supporting the second type of keyboard and associated interface. The keyboard interface further includes coupling means responsive to the first mode select signal for coupling the first set of control signals to the set of terminals and responsive to the second mode select signal for coupling the second set of control signals to the set of terminals and mode select means coupled to the first keyboard logic means, the second keyboard logic means, and the coupling means for selectively providing the first or second mode select signals.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawing, in the sole figure of which like reference numerals identify identical elements, and wherein the sole figure is a detailed block diagram of a keyboard interface embodying the present invention.

DETAILED DESCRIPTION OF THE PREFERRED EMBODIMENT

Referring now to the sole figure, it illustrates in block diagram form, a keyboard interface 10 embodying the present invention. The keyboard interface 10 is preferably implemented in an integrated circuit which includes an internal address bus 12, an internal control bus 14 and an internal data bus 16. The keyboard interface 10 is adapted to support either an external first type of keyboard and associated interface 18 or a second type of keyboard and associated interface 20 wherein the first and second types of keyboards an associated interface are different types of keyboards and associated interfaces. More specifically, the first type of keyboard and associated interface may be an XT keyboard 22 and an XT keyboard interface 24 and the second type of keyboard and associated interface may be an AT keyboard 26 and an 8042 AT microcontroller keyboard interface 28. The keyboards 22 and 26 and their associated interfaces 24 and 28 are well known in the art. Each type of keyboard and associated interface requires its own unique set of support control signals with the XT keyboard and interface requiring, as well known in the art, XTKBCLK clock signals on a line 30, and XTKBRST reset signals on a line 32. The XT keyboard and interface further requires an XTKBDATA data output on a line 34.

The AT keyboard and associated interface requires another unique set of control signals, as well known in the art, which include KEYCLK clock signals on a line 36, RESET reset signals on a line 38, and CS8042 select signals on a line 40.

As will be noted in the figure, the keyboard interface 10 includes a set of terminals including terminals 42, 44 and 46 which are adapted to be coupled to either the XT keyboard and interface 18 or the AT keyboard and interface 20 for supporting either type of keyboard and associated interface in a manner to be described hereinafter.

The keyboard interface 10 generally includes system input/output logic 50, an XT keyboard logic 52, an AT keyboard logic 54, a keyboard signal multiplexer 56, a keyboard configuration register 58 and an XT keyboard register 60. The keyboard interface 10 is particularly adapted for use in a personal computer which includes a central processing unit. The system input/output logic 50 is coupled to the internal data bus 12 the internal control bus 14 and the internal data bus 16 for coupling the keyboard interface 10 to the central processing unit of the personal computer system which is preferably integrated within the same integrated circuit as the keyboard interface 10.

The keyboard interface 10 is preferably assigned a unique address to permit the central processing unit to address the keyboard interface, To that end, the system input/output logic 50 is coupled to the internal address bus 12 for receiving and decoding the keyboard interface address when the keyboard interface is addressed by the central processing unit. The system input/output logic is also coupled to the internal control bus 14 to enable the input/output logic to provide an acknowledgement onto the control bus in response to being addressed by the central processing unit. The internal control bus 14 also provides the keyboard interface 10 with control signals such as timing signals through the system input/output logic 50.

The system input/output logic 50 is further coupled to the internal data bus 16 for transferring data in an 8-bit parallel format to the central processing unit or to memory under control of the central processing unit over the internal data bus 16. As will be seen hereinafter, the XT keyboard and associated interface provides data generated by the keyboard 22 in a serial-bit format over line 34 which is converted by the keyboard interface 10 to an 8-bit parallel format and placed onto the bus 16 through the system input/output logic 50.

The XT keyboard logic 52 is responsive to a first mode select signal for providing a first set of control signals for supporting the XT keyboard and associated interface 18. XT keyboard logics are well known in the art in terms of both configuration and functionality and the XT keyboard logic 52 may be implemented in this manner. The XT keyboard logic 52 provides the first set of control signals over a multiple-bit parallel bus 62 which is divided into a first section including a two-bit parallel bus 64 and a second section including a 2-bit parallel bus 66. The bus 64 includes a pair of conductors which convey to the keyboard signal multiplexer 56 the clock and reset control signals for the XT keyboard interface 24. The control signals conveyed over the bus 66 are utilized by the XT keyboard register 60 for activation and timing purposes. The XT keyboard register 60 preferably is a serial-input parallel-output shift register arranged to convert the serial-bits of data provided by the XT keyboard and interface 18 over line 34 to the aforementioned parallel-bit format.

The AT keyboard logic 54 is responsive to a second mode select signal for providing a second set of control signals for supporting the AT keyboard and associated logic 20. AT keyboard logics are well known in the art in terms of both configuration and functionality and the AT keyboard logic 54 may be implemented in such a known manner. It provides over a 3-bit parallel bus the control clock, reset, and select signals required for supporting the AT keyboard and associated interface 20.

The keyboard configuration register 58 comprises a single-bit storage register for selecting the first and second modes of operation of the keyboard interface 10. It provides a first binary voltage level (logical one) corresponding to the first mode of operation for supporting the XT keyboard and associated interface 18 and a second binary voltage level (logical zero) corresponding to the second mode of operation for supporting the AT keyboard and associated logic 20. Hence, the keyboard configuration register 58 provides first or second mode select signals corresponding to its single-bit being set or not set. The keyboard configuration register 58 is coupled to the XT keyboard logic 52, the AT keyboard logic 54, and the keyboard signal multiplexer 56. When the keyboard configuration register 58 provides the first mode select signal, the XT keyboard logic 52 is activated and the keyboard signal multiplexer 56 couples the XT keyboard clock signals to terminal 42 and the XT reset signals to terminal 44 for providing these signals to lines 30 and 32 respectively. Also, the keyboard signal multiplexer 56 couples terminal 46 to a conductor 70 to convey the serial bits of data provided by the XT keyboard and associated interface 18 from line 34, to terminal 46 and through conductor 70 to the XT keyboard register 60. The XT keyboard register, as previously mentioned, converts the serial bits of data to parallel bits and conveys the parallel bits of data to the system input/output logic 50 over an 8-bit parallel bus 72. The system input/output logic 50 then conveys the parallel bits of data to the internal data bus 16.

When the keyboard configuration provides the second mode select signal, the AT keyboard logic 54 is activated and provides the AT keyboard clock, reset and select control signals to the keyboard signal multiplexer. The keyboard signal multiplexer 56, in response to the second mode select signal, couples the AT clock signals to terminal 42, the AT reset control signals to terminal 44 and the AT keyboard select signals to terminal 46 so that these control signals may be conveyed to the AT keyboard and associated interface 20 over lines 36, 38 and 40 respectively.

The system input/output logic 50 is also coupled to the XT keyboard logic 52 and the AT keyboard logic 54. This provides timing and other control signals, of a type well known in the art, to the XT keyboard logic 52 and AT keyboard logic 54 which the system input/output logic 50 receives over the internal control bus 14.

When in the second mode, wherein the AT keyboard and associated interface 20 are supported, the 8042 AT keyboard interface 28 provides data generated by the AT keyboard 26 in an 8-bit parallel format. The 8-bit parallel data is buffered by a buffer 74 and placed onto the internal data bus over an 8-bit parallel bus 76.

As can be seen from the foregoing, the keyboard interface of the present invention provides support for either an XT keyboard and associated interface or an AT keyboard and associated interface at the same set of integrated circuit terminals. This not only limits the number of terminals required on the integrated circuit for this purpose, but in addition, offers the system user with the flexibility of being able to select either an XT type keyboard or an AT type keyboard.

While a particular embodiment of the present invention has been shown and described, modifications may be made, and it is therefore intended to cover in the appended claims all such changes and modifications which fall within the true spirit and scope of the invention.

What is claimed is:

1. A general keyboard interface implemented in an integrated circuit for use in a system requiring a keyboard and keyboard interface, said general keyboard interface enabling said system to operate with either a type of keyboard and keyboard interface or a second type of keyboard and keyboard interface external to said integrated circuit for entering data onto an internal data bus within said integrated circuit, wherein said first and second types of keyboards and keyboard interfaces are of respective different types, said general keyboard interface being operable in a first mode to support said first type of keyboard and keyboard interface or in a second mode to support said second type of keyboard and keyboard interface, said general keyboard interface comprising:

a set of terminals for coupling to the keyboard interface for providing a first set of control signals to said first type of keyboard interface or for coupling to the second keyboard interface for providing a second set of control signals to said second type of keyboard interface;

first keyboard logic means responsive to a first mode select signal for providing the first set of control signals for supporting said first type of keyboard and associated interface;

second keyboard logic means responsive to a second mode select signal for providing the second set of control signals for supporting said second type of keyboard and associated interface;

coupling means responsive to said first mode select signal for coupling said first set of control signals to said set of terminals and responsive to said second mode select signal for coupling said second set of control signals to said set of terminals; and mode select means coupled to said first keyboard logic means, said second keyboard logic means, and said coupling means for selectively providing said first or second mode select signals.

2. A general keyboard interface as defined in claim 1 wherein said coupling means comprises a multiplexer.

3. A general keyboard interface as defined in claim 1 wherein said mode select means comprises a storage register.

4. A general keyboard interface as defined in claim 3 wherein said storage register is a single-bit register for providing a first binary voltage level corresponding to one of said mode select signals and a second binary voltage level corresponding to the other said mode select signal.

5. A general keyboard interface as defined in claim 1 wherein said first type of keyboard and associated interface provides serial bits of data, wherein said data bus is a parallel-bit data bus, and wherein said keyboard interface further includes serial-bit to parallel-bit conversion means for converting said serial-bits of data to parallel-bits of data.

6. A general keyboard interface as defined in claim 5 wherein said serial-bit to parallel-bit conversion means is coupled to said first keyboard logic means for being activated responsive to said first mode select signal.

7. A general keyboard interface as defined in claim 6 wherein said serial bits of data are supplied to one terminal of said set of terminals and wherein said coupling means is arranged to convey said serial-bits of data to said serial-bit to parallel-bit conversion means.

8. A general keyboard logic as defined in claim 7 wherein said serial-bit to parallel-bit conversion means comprises a serial-input parallel-output shift register.

9. A general keyboard interface as defined in claim 7 further including input/output logic means coupled between said serial-bit to parallel-bit conversion means and said data but for conveying said parallel bits of data to said data bus.

10. A general keyboard interface as defined in claim 1 wherein said integrated circuit includes an internal address bus, wherein said keyboard interface has a unique address for being addressed, and wherein said general keyboard interface further includes an input/output logic means coupled to said address bus for decoding said unique address when said general keyboard interface is addressed.

11. A general keyboard interface as defined in claim 10 wherein said integrated circuit further includes an internal control bus, wherein said input/output means is coupled to said control bus, and wherein said input/output logic means is arranged to provide an acknowledgement onto said control bus in response to being addressed.

12. A general keyboard interface as defined in claim 11 wherein said control bus is arranged to provide timing control signals and wherein said input/output logic means is coupled to said first and second keyboard logic means for providing said first and second keyboard logic means with said timing control signals.

* * * * *